US010329835B2

(12) United States Patent
Geyser

(10) Patent No.: US 10,329,835 B2
(45) Date of Patent: Jun. 25, 2019

(54) INFLATABLE WINDOW COVERING SYSTEM FOR IMPROVING HOME EFFICIENCY

(71) Applicant: Conrad Geyser, Cotuit, MA (US)

(72) Inventor: Conrad Geyser, Cotuit, MA (US)

( * ) Notice: Subject to any disclaimer, the term of this patent is extended or adjusted under 35 U.S.C. 154(b) by 0 days.

(21) Appl. No.: 14/846,532

(22) Filed: Sep. 4, 2015

(65) Prior Publication Data
US 2017/0067283 A1 Mar. 9, 2017

(51) Int. Cl.
E06B 7/16 (2006.01)
E06B 7/23 (2006.01)
E04B 1/68 (2006.01)
E04B 1/78 (2006.01)
E06B 7/18 (2006.01)
E06B 9/24 (2006.01)
G08C 17/02 (2006.01)

(52) U.S. Cl.
CPC ............. *E06B 7/2318* (2013.01); *E04B 1/68* (2013.01); *E04B 1/78* (2013.01); *E06B 7/16* (2013.01); *E06B 7/18* (2013.01); *E06B 9/24* (2013.01); *E06B 2009/2476* (2013.01); *E06B 2009/2482* (2013.01); *G08C 17/02* (2013.01); *Y02A 30/257* (2018.01); *Y02B 80/50* (2013.01)

(58) Field of Classification Search
CPC ... E04H 2015/206; E06B 7/2318; E06B 7/16; E06B 7/18; E06B 9/24; E06B 2009/2482
USPC ...................................... 160/89, 90
See application file for complete search history.

(56) References Cited

U.S. PATENT DOCUMENTS

| 3,359,687 A | * | 12/1967 | Wallace | B64D 13/04 49/477.1 |
| 3,918,512 A | * | 11/1975 | Kuneman | E06B 3/2605 160/90 |
| 4,038,788 A | * | 8/1977 | Claessens | E04B 7/166 52/15 |
| 4,040,210 A | * | 8/1977 | Land | E06B 9/24 160/90 |
| 4,255,907 A | * | 3/1981 | Lightell | E06B 3/285 160/90 |
| 4,255,908 A | * | 3/1981 | Rosenberg | E06B 3/285 49/477.1 |

(Continued)

FOREIGN PATENT DOCUMENTS

JP 10-159464 A 6/1998

OTHER PUBLICATIONS

PCT International Search Report for PCT International Patent Application No. PCT/EP2016/050438, dated Dec. 21, 2016.

*Primary Examiner* — Katherine W Mitchell
*Assistant Examiner* — Abe Massad
(74) *Attorney, Agent, or Firm* — Holland & Hart LLP

(57) ABSTRACT

An inflatable, window-covering system is described. The inflatable, window-covering system may include an inflatable cushion and a drive assembly, the drive assembly including a power source; one or more sensors, where the one or more sensors may be configured to detect a triggering event; and an air pump configured to inflate the inflatable cushion based, at least in part, on the detected triggering event. In some cases, the triggering event may include any of sensing a predetermined temperature, sensing a predetermined level of light intensity, sensing a predetermined time, or receiving an instruction, or any combination thereof.

15 Claims, 4 Drawing Sheets

(56) References Cited

U.S. PATENT DOCUMENTS

| | | | | |
|---|---|---|---|---|
| 4,318,251 A * | 3/1982 | Winkler | ............ | A01G 9/225 |
| | | | | 47/17 |
| 4,344,473 A | 8/1982 | Shore | | |
| 4,346,132 A * | 8/1982 | Cheng | ............ | B32B 3/12 |
| | | | | 156/147 |
| 4,352,259 A * | 10/1982 | Smith | ............ | A01G 9/225 |
| | | | | 47/17 |
| 4,453,584 A | 6/1984 | Steele | | |
| 4,502,522 A | 3/1985 | Liljendahl | | |
| 4,506,720 A * | 3/1985 | Iwanicki | ............ | E06B 9/24 |
| | | | | 160/121.1 |
| 4,672,888 A * | 6/1987 | Crombie | ............ | A01G 9/241 |
| | | | | 137/360 |
| 5,937,595 A * | 8/1999 | Miller | ............ | E06B 3/285 |
| | | | | 52/2.11 |
| 7,094,144 B2 * | 8/2006 | Dube | ............ | A01K 1/0064 |
| | | | | 454/334 |
| 7,748,169 B2 * | 7/2010 | Cote | ............ | E06B 9/02 |
| | | | | 454/334 |
| 8,347,938 B2 * | 1/2013 | Schaumberger | ............ | E06B 9/264 |
| | | | | 160/168.1 P |
| 2005/0022946 A1 * | 2/2005 | Domel | ............ | E06B 9/322 |
| | | | | 160/168.1 P |
| 2014/0223828 A1 | 8/2014 | Eansor | | |

* cited by examiner

INFLATABLE WINDOW COVERING SYSTEM FOR IMPROVING HOME EFFICIENCY

BACKGROUND

Insulation is a common technique used to prevent energy loss in homes or other structures. Insulation provides resistance to heat transfer, which can reduce the need for air conditioning or heating, and thereby increase energy savings. Insulating a home or other structure may prevent the building from becoming too warm or too cool based on changing weather. Preventing heat transfer through windows is less common than insulation of, for example, a roof or walls. A common method of preventing heat transfer through windows is mitigating air flow through windows or shading windows such that undesirable temperatures outside the building do not affect the temperatures inside the building. Most households use cellular or roman shades for blocking sunlight through a window, which can sometimes prevent heat from the sun from warming a room to an uncomfortable temperature. However, conventional shades do not entirely cover the window or securely seal to the window frame or against window. Typical shading systems do not provide sufficient insulation or airtightness to noticeably prevent heat transfer through a window. Systems that provide thicker, window-covering material often require manual deployment or a track to keep the material properly covering the window. Manual deployment may require physical labor, and a track may be an obtrusive, inefficient, or unreliable method of deployment.

SUMMARY

The foregoing and other features, utilities and advantages will be apparent from the following more particular design description of various embodiments as illustrated in the accompanying drawings.

The disclosure herein includes methods and systems for improving energy efficiency in a building. In some embodiments, the present systems and methods may include inflating an inflatable cushion to cover a window. The inflatable cushion may abut each edge of the window frame and completely cover the window, without the need for installation of bulky or unsightly tracks on the window frame to keep the cushion in place. The inflatable cushion may prevent sunlight from entering the building and warming the building to too high of a temperature. In other embodiments, the inflatable cushion may be inflated in cases where the outside temperature is too low. If the outside temperature is colder than a desired inside temperature, the inflatable cushion may be inflated to prevent heat inside the building from dissipating through the window. In another embodiment, the inflatable cushion may be deployed if there is insufficient sunlight outside the building, and, for example, the occupants of the building desire privacy or want to maintain the current temperature of the building overnight.

An inflatable, window-covering system is described. In some embodiments, the system may include an inflatable cushion and a drive assembly. The drive assembly may include a power source; one or more sensors, where the sensors may be configured to detect a triggering event; and an air pump, which may be configured to inflate the inflatable cushion based, at least in part, on the detected triggering event.

In some embodiments, the inflatable cushion may include two or more cushion layers having a plurality of sealed edges, where the two or more cushion layers may form an inflatable compartment there between. The inflatable cushion may also include a plurality of air passages formed within the inflatable compartment. In some embodiments, the inflatable cushion may be formed from a textile or plastic, or a combination thereof, where the plastic may be thermoplastic polyurethane. In some embodiments, two or more of the plurality of air passages may intersect.

In some embodiments, a microcontroller may be used to control the drive assembly, and the microcontroller may be configured to be controlled by user equipment such as a cellphone or a computer. In some embodiments, the triggering event may include any of sensing a predetermined temperature inside or outside of the building in which the window is installed, sensing a predetermined level of light intensity, sensing a predetermined time, or receiving an instruction, or any combination thereof.

In some embodiments, one or more of the sensors and the air pump may be powered by the power source. In some cases, the power source may include one or more solar cells, or one or more batteries, or a combination thereof. In some cases, the air pump may be configured to deflate the inflatable cushion based, at least in part, on the detected triggering event.

A method for sealingly covering a window is described. In some embodiments, the method may include detecting a first triggering event and inflating a window cushion positioned at a first edge of the window based, at least in part, on the detected first triggering event, where the window cushion is inflated until each edge of the window cushion abuts each edge of the window.

In some embodiments, the method may include detecting a second triggering event and deflating the window cushion based, at least in part, on the detected second triggering event, where the window cushion may be deflated until the window cushion is returned to the first edge of the window from which the window cushion was inflated. In some cases, the window cushion may be formed from a textile or a plastic, or a combination thereof. In some cases, the plastic may be thermoplastic polyurethane. In some cases, the triggering event may comprise any of sensing a predetermined temperature, sensing a predetermined level of darkness, sensing a predetermined time, or receiving an instruction, or any combination thereof. In some cases, the triggering event may be initialized by a microcontroller. In some cases, the microcontroller may be configured to be controlled by a user equipment.

Aspects of the present disclosure relate to an inflatable, window-covering system including a drive assembly and an inflatable cushion. In some examples, the window-covering system may be in an inflated state, entirely covering a window. When inflated, the inflatable cushion may press firmly against every side of a window frame supporting the window, without the need for tracks in the window frame to secure the cushion. In other examples, the window-covering system may be in a retracted state. When retracted, the inflatable cushion may be deflated and retracted so that the inflatable cushion is retracted toward the drive assembly such that it no longer obstructs the window. Because the system works without the need for tracks, the window will remain aesthetically pleasing when the cushion is in a retracted state.

The drive assembly may include multiple solar panels, multiple rechargeable batteries, multiple sensors, a microcontroller, and an air pump. The inflatable, window-covering system may be powered by the solar panels or batteries, or by both the solar panels and the batteries, at any time. The solar panels may be made from silicon, and the batteries may be lithium-ion batteries.

In some cases, the drive assembly may deflate the inflated cushion, and the inflatable cushion may retract toward the drive assembly so that the inflatable cushion no longer obstructs the window. The air pump may be connected to air passages within the inflatable cushion. When the air pump deflates air from the air passages, the inflatable cushion may shrink to a noticeably smaller size, and the inflatable, window-covering system may be in a retracted state. When the inflatable, window-covering system is in a retracted state, the drive assembly may be triggered to inflate the window-covering system, and the air pump may inflate the inflatable cushion by pumping air into the air passages.

The drive assembly may inflate or deflate the inflatable cushion based, at least in part, on a triggering event. A variety of sensors may relay information, such as the temperature inside or outside of the building in which the window is installed, light intensity (e.g., sunlight) detected by the sensors, time of day, and a variety of other metrics, to the microcontroller, and the information gathered may cause a triggering event if the information crosses a threshold or a predetermined level. For example, if the outside temperature is hotter or colder than a predetermined, desired inside temperature, the inflatable cushion may deploy to impede temperature change within the building. Similarly, if an inside temperature is above or below a predetermined temperature, the cushion may be deployed or retracted to alter the temperature inside the building. In some cases, the triggering event may be caused by a signal from a user equipment, such as a cell phone or a computer, and the drive assembly may connect to a wireless system, such as Bluetooth or Wi-Fi, to receive the signal from the user equipment.

The inflatable cushion may contain multiple, intersecting air passages. The air passages may form a rigid, flat surface inside the inflatable cushion when inflated. The air passages may be welded together (i.e., coupled together by heat). The air passages and inflatable cushion may be made of a plastic or a fabric, or a combination thereof, and the plastic may be, for example, thermoplastic polyurethane, silicone, or polyurethane laminate.

DETAILED DESCRIPTION

Figure 1:
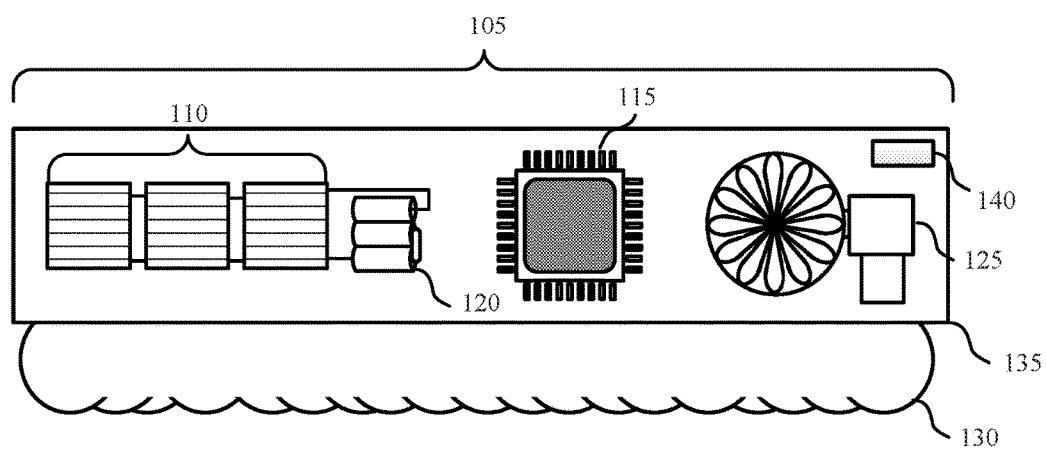
FIG. 1 is a perspective view of the inflatable, window-covering system according to various aspects of the invention.

With reference now to the drawings, an exemplary system and configuration is discussed. FIG. 1 illustrates an exemplary inflatable, window-covering system 100. The inflatable, window-covering system 100 is illustrated in a deflated state and may include a drive assembly 105 and an inflatable cushion 130. The drive assembly 105 may control inflating or deflating the inflatable cushion 130. The drive assembly 105 may include a set of solar panels 110, a set of batteries 120, a microcontroller 115, an air pump 125, and/or a plurality of sensors 140. The drive assembly 105 may be attached to a window frame 135. In this example, the set of solar panels 110 contains three solar panels, but any number of solar panels may be used in other examples. The solar panels in the set of solar panels 110 may be silicon photovoltaic cells, which may convert sunlight into electrical energy and, in some cases, may recharge a set of batteries 120. In shaded or dark conditions, the set of solar panels 110 may be turned at least partially off, and the inflatable, window-covering system 100 may be powered by the set of batteries 120. The illustrated set of batteries 120 contains three batteries, but any number of batteries may be used. The set of batteries 120 may be rechargeable lithium-ion batteries. The inflatable, window-covering system 100 may be powered by the set of batteries 120 or the set of solar panels 110, or both, at any point in time.

The microcontroller 115 may be used to control the drive assembly 105. The microcontroller 115 may detect a triggering event based on the readings from the sensors 140 and may activate the air pump 125 based, at least in part, on the detected triggering event. The sensors 140 may be operable to detect, for example, temperature, light intensity, time, user input through buttons, switches, or toggles positioned on or remotely from the drive assembly 105, or a signal from an external source such as a cellphone or a computer. If a reading from the sensors 140 has crossed a threshold or a predetermined level, the sensors 140 may send a signal representing the triggering event to the microcontroller 115. Alternatively, the microcontroller 115 may be constantly receiving the readings from the sensors 140, and the microcontroller 115 may compare the readings from the sensors 140 to a threshold or a predetermined level to detect the triggering event. For example, the microcontroller 115 may determine that the temperature information being relayed by the sensors 140 may be hotter or colder than a desired inside temperature, and the microcontroller may signal to the air pump to inflate the inflatable cushion 130 so that the temperature inside may not change as drastically. In some cases, the microcontroller 115 may be configured to be remotely controlled by a user equipment, such as a cellphone or a computer. The inflatable, window-covering system 100 may be configured to connect to a user equipment through a wireless system, for example Bluetooth or Wi-Fi. In some cases, the microcontroller 115 may be configured to detect a triggering event caused by the drive assembly 105 receiving an instruction from a user. The user may input instructions, for example, through a button, switch, or toggle positioned on or remotely from the drive assembly 105. If the microcontroller 115 detects the triggering event, the microcontroller 115 may signal to the air pump 125 to inflate or deflate the inflatable cushion 130.

In FIG. 1, the inflatable cushion 130 may be deflated and in a retracted state. The inflatable cushion 130 may be attached to the drive assembly 105. Specifically, the inflatable cushion 130 may be attached to the air pump 125, so that the inflatable cushion 130 may be inflated or deflated by the air pump 125. In this illustrated example, the inflatable cushion 130 is retracted to the top side of the window frame 135. In other embodiments, the inflatable cushion 130 may be retracted to any side of the window frame or combination of sides of the window frame. In some cases, the inflatable cushion 130 may be formed from a textile or a plastic, or a combination of both, where the plastic may be, for example, thermoplastic polyurethane, silicone, or polyurethane laminate. The inflatable cushion 130 may contain multiple air passages. In this example, the air passages may not be inflated, making the inflatable cushion 130 compressed. The air passages, and by extension the inflatable cushion 130, may be pumped with air from the air pump 125 so that the inflatable cushion 130 inflates to abut each edge of the window frame 135, completely covering a window. If the microcontroller 115 receives a triggering event, the microcontroller 115 may signal to the air pump 125 to inflate the inflatable cushion 130.

Figure 2:
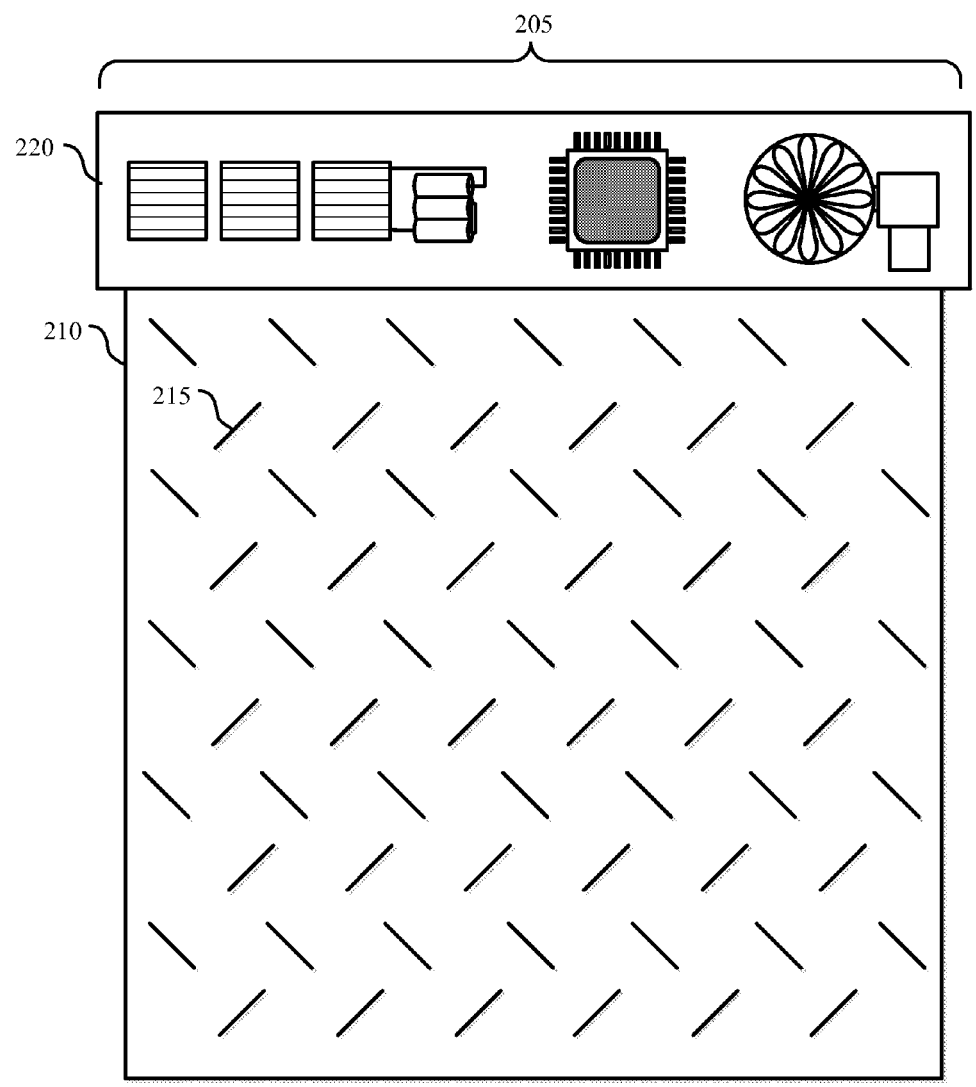
FIG. 2 is a perspective view of the inflated cushion.

FIG. 2 illustrates an inflated, window-covering system 200. The inflated, window-covering system 200 may be in an inflated state and include a drive assembly 205. The drive assembly 205 may be an example of the drive assembly 105 as described in FIG. 1. The drive assembly 205 may be attached to a window frame 220. An inflated cushion 210 may be attached to the drive assembly 205. In this illustrated example, the inflated cushion 210 is attached to the drive assembly 205 at the top side of the window frame 220, but the drive assembly 205 may be attached to any side or sides of the window frame 220. The inflated cushion 210 may be an example of the inflatable cushion 130 in FIG. 1 after an air pump 125 has inflated the inflatable cushion 130. If the drive assembly 205 detects a triggering event from one of the sensors, the drive assembly 205, specifically the air pump, may deflate the inflated cushion 210.

The inflated cushion 210 may contain multiple air passages. When the multiple air passages are inflated, the inflated cushion 210 may inflate to cover a window supported by the window frame 220. A coupling 215 may make the inflated cushion 210 firm and form-fitting to the window. The coupling 215 may be one of multiple couplings within the inflated cushion 210. The couplings within the inflated cushion 210 may be at least partially diagonal to each other so that the inflated cushion may not be easily foldable while inflated. The couplings may provide a stiffness at various points within the inflated cushion 210 so that the inflated cushion may not easily bend or move. These couplings therefore allow the inflated cushion 210 to be flat when inflated, and also facilitate inflation and securing of the inflated cushion in the window frame without the need for tracks. The coupling 215 may be made in part from welds holding the air passages together. The coupling 215 may prevent the inflated cushion 210 from bending, being removed from the window, or otherwise not entirely covering the window. The couplings may be formed by the air passages being physically bonded together by heat (i.e., being welded together) or from a formation of the air passages within the inflated cushion 210. The air passages may be intersecting, which may also lead to the coupling 215. In some cases the air passages may be welded in an intersecting pattern, which may also lead to a coupling 215. The inflated cushion 210 may press against the window frame 220.

Figure 3:
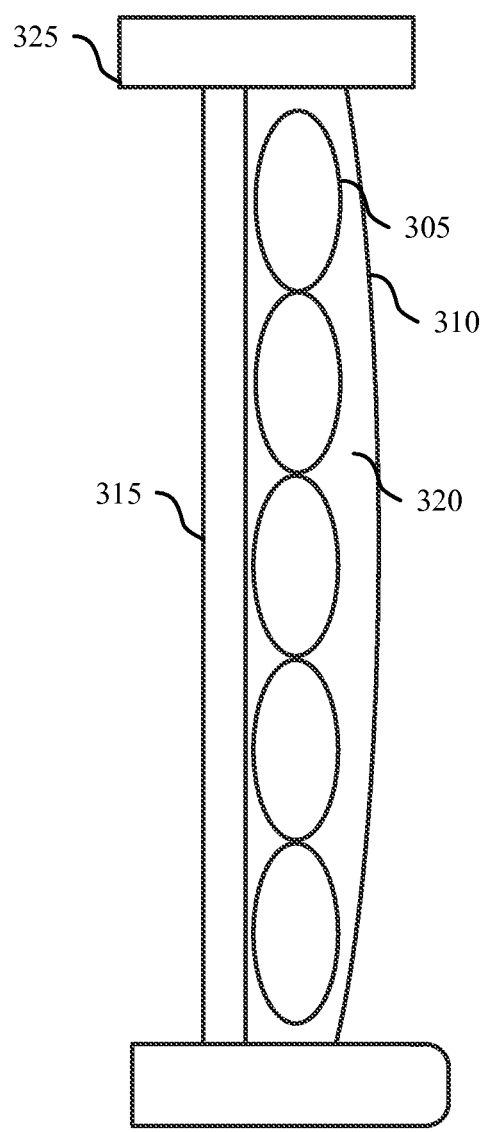
FIG. 3 is a cross section of a side view of the inflated cushion.

FIG. 3 illustrates a cross section of a side view of an inflatable cushion 300. The side view of the inflatable cushion 300 may include an inflated cushion 320. The inflated cushion 320 may be an example of the inflated cushion 210 as described in FIG. 2. The inflated cushion 320 may include a cushion layer 310 and a plurality of air passages, such as an air passage 305. The air passage 305 may intersect with other air passages within the inflated cushion 320. The intersection of air passage 305 with other air passages may cause the inflated cushion 320 to be more rigid, and the intersection of air passages may be welded. When inflated, the inflated cushion 320 may completely cover the window 315. The rigid intersection of air passages may cause the inflated cushion 320 to firmly press against the window frame 325. The air passage 305 may be inflated by an air pump, such as air pump 125 as described in FIG. 1

The air passage 305 may be bound within the cushion layer 310. The cushion layer 310 may be flat when the air passages of the system are inflated, due at least partially to the rigid intersection of air passages. The inflated cushion 320 may be bound by and firmly pressed against each side of the window frame 325 and the window 315. The inflated cushion 320 may be attached to any side or sides of the window frame 325. The air passage 305 may be able to decompress so that the inflated cushion 320 recedes, for example, into one side of the window frame 325. The air passage 305 and the cushion layer 310 may be made out of fabric, plastic, rubber, or any combination thereof. If the air passage 305 or the cushion layer 310 are made of plastic, the plastic may be thermoplastic polyurethane.

Figure 4:
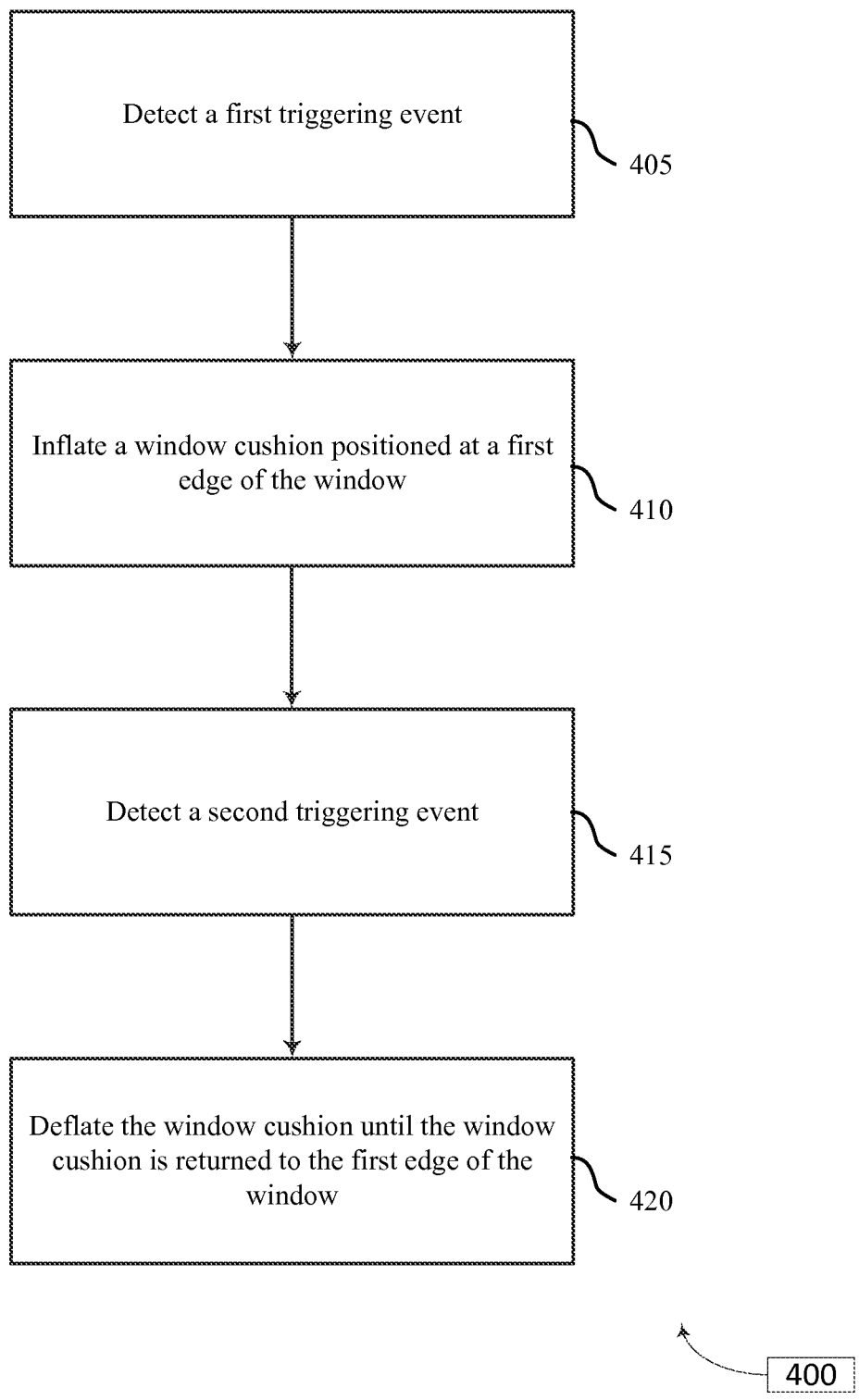
FIG. 4 is a flow chart illustrating an example of a method relating to inflating or deflating an inflatable cushion based on a triggering event.

FIG. 4 is a flow chart illustrating an example of a method 400 for inflating or deflating an inflatable cushion based on a triggering event, in accordance with various aspects of the present disclosure. For clarity, the method 400 is described below with reference to aspects of one or more of the inflatable, window-covering system described in FIGS. 1-3.

At block 405, the method 400 may include detecting a first triggering event. The first triggering event may include any of sensing a predetermined temperature inside or outside the building in which the window is installed, sensing a predetermined level of light intensity, sensing a predetermined time, or receiving an instruction, or any combination thereof. For example, if the temperature outside of the building is warmer than the desired temperature for the inside of the building, a sensor or a microcontroller may detect the temperature as a triggering event. The first triggering event may be a signal from a user equipment to the microcontroller. The microcontroller may be configured to communicate with the user equipment by connecting to a wireless communication system such as Bluetooth or Wi-Fi.

At block 410, the method 400 may include inflating a window cushion positioned at a first edge of the window. Initiation of the inflating may be based, at least in part, on the detected first triggering event. The window cushion may be inflated until each edge of the window cushion abuts each edge of the window frame. The window cushion may be inflated by an air pump, for example the air pump attached to the drive assembly illustrated in FIG. 1.

At block 415, the method 400 may include detecting a second triggering event. The second triggering event may include any of sensing a predetermined temperature, sensing a predetermined level of light intensity, sensing a predetermined time, or receiving an instruction, or any combination thereof, in a similar way to the detection of the first triggering event described above with respect to block 405. The second triggering event may be a signal from a user equipment to a microcontroller. The microcontroller may be configured to communicate with the user equipment by connecting to a wireless communication system such as Bluetooth or Wi-Fi.

At block 420, the method 400 may include deflating the window cushion until the window cushion is returned to the first edge of the window. The deflating may be initiated based, at least in part, on the second triggering event detected in block 415. The window cushion may be deflated using the air pump from block 415.

Thus, the method 400 may include inflating or deflating an inflatable cushion to improve home efficiency. It should be noted that the method 400 is just one implementation and that operations of the method 400 may be rearranged or otherwise modified such that other implementations are possible.

The previous description is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. An inflatable window covering system for use with a window of a building, comprising:
    a support structure coupled to a top edge of a window frame of the window and defining an enclosure;
    a power source positioned in the enclosure of the support structure;
    a microcontroller positioned in the enclosure of the support structure and coupled to the power source;
    two or more sensors coupled to the microcontroller, the two or more sensors being configured to detect a temperature external to a building and a temperature internal to the building;
    an inflatable cushion attached to a bottom side of the support structure;
    an air pump positioned in the enclosure of the support structure and coupled to the power source, the air pump configured to inflate the inflatable cushion based at least in part on the detected temperature external to the building and the detected temperature internal to the building;
    wherein the inflatable cushion comprises two or more cushion layers having a plurality of sealed edges, wherein the two or more cushion layers form a single inflatable compartment with a plurality of couplings welding the two or more cushion layers, wherein, in an inflated state, the inflatable cushion abuts a distal edge of the window frame, and in a deflated state, the inflatable cushion is retracted to abut the bottom side of the support structure.

2. The system of claim 1, wherein the inflatable cushion is formed from a textile or a plastic, or a combination thereof.

3. The system of claim 2, wherein the plastic is thermoplastic polyurethane (TPU).

4. The system of claim 1, wherein the microcontroller is controlled by a user equipment (UE).

5. The system of claim 1, wherein the power source comprises:
    one or more solar cells, or one or more batteries, or a combination thereof.

6. The system of claim 1, wherein the air pump further deflates the inflatable cushion based, at least in part, on the detected temperature external to a building and a temperature internal to the building.

7. The system of claim 1, wherein the inflatable cushion, when in the inflated state, has a width dimension and a length dimension, the width dimension extending across a width of the window frame and the length dimension extending along a height of the window frame, and the couplings are arranged diagonal to the width and length dimensions of the inflatable cushion.

8. A method for creating an airtight covering for a window, comprising:
    providing an inflatable window covering system configured to cover the window, the window covering system including a support member coupled to a top edge of a window frame extending around the window, the support member defining an enclosure, the window covering system including a window cushion having two or more cushion layers having a plurality of sealed edges, wherein the two or more cushion layers form a single inflatable compartment with a plurality of couplings welding the two or more cushion layers together, wherein, in an inflated state, the window cushion extends from the support member to a bottom edge of the window frame, and, in a deflated state the window cushion abuts the support member at the top edge of the window frame;
    detecting, with a first sensor of the window covering system, a temperature external to the window;
    detecting, with a second sensor of the window covering system, a temperature internal to the window;
    inflating, automatically with a pump positioned in the enclosure of the support member, the inflatable cushion positioned at the proximal edge of the window frame proximate the support member based at least in part on the detected temperature external to the window and the detected temperature internal to the window, until each edge of the window cushion abuts each edge of the window frame;
    deflating, with the pump, the window cushion based, at least in part, on the detected temperature internal to the window, wherein the window cushion is deflated until the window cushion is returned to abut the support structure.

9. The method of claim 8, wherein the window cushion is formed from a textile or a plastic, or a combination thereof.

10. The method of claim 9, wherein the plastic is thermoplastic polyurethane (TPU).

11. The method of claim 8, wherein a microcontroller is configured to initiate inflating and deflating the window cushion.

12. The method of claim 11, wherein the microcontroller is configured to be remotely controlled by a user equipment (UE).

13. The method of claim 8, wherein the window cushion, when in the inflated state, has a width dimension and a length dimension, the width dimension extending across a width of the window frame and the length dimension extending along a height of the window frame, and the couplings are arranged diagonal to the width and length dimensions of the window cushion.

14. An inflatable window covering system for use with a window of a building, comprising:
    an inflatable cushion comprising two or more cushion layers having a plurality of sealed edges, the two or more cushion layers forming a single inflatable compartment with couplings welding the two or more cushion layers together, wherein, in an inflated state, the inflatable cushion abuts a bottom edge of a window frame surrounding the window, the inflatable cushion, when in the inflated state, has a width dimension and a length dimension, the width dimension extending across a width of the window frame and the length dimension extending along a height of the window frame, and the couplings are arranged diagonal to the width and length dimensions of the inflatable cushion;
    a support member coupled to a top side of the window frame and defining an enclosure, the inflatable cushion being attached to the support structure;

a power source positioned in the enclosure;

a microcontroller positioned in the enclosure and coupled to the power source, wherein the microcontroller controls the drive assembly;

two or more sensors coupled to the microcontroller, wherein the two or more sensors are configured to detect a temperature external to the building and a temperature internal to the building; and an air pump positioned in the enclosure and coupled to the power source, wherein the air pump is configured to inflate the inflatable cushion based at least in part on the detected internal and external temperatures.

15. The system of claim 14, wherein the power source comprises a series of solar panels and rechargeable batteries.

* * * * *